United States Patent [19]

Tsuchiya et al.

[11] Patent Number: 5,793,734
[45] Date of Patent: Aug. 11, 1998

[54] OPTICAL PICKUP DEVICE

[75] Inventors: Rikio Tsuchiya; Atsushi Kitamura; Toshinori Chino, all of Asaba-cho, Japan

[73] Assignee: Minebea Co., Ltd., Nagano, Japan

[21] Appl. No.: 838,651

[22] Filed: Apr. 9, 1997

[30] Foreign Application Priority Data

Aug. 21, 1996 [JP] Japan ................... 8-238603

[51] Int. Cl.⁶ .......................................... G11B 7/00
[52] U.S. Cl. .................. 369/112; 369/44.23; 369/44.37; 369/94; 369/44.24; 369/118
[58] Field of Search .................... 369/44.23, 44.24, 369/44.37, 94, 112, 118, 109, 103

[56] References Cited

U.S. PATENT DOCUMENTS

| | | | |
|---|---|---|---|
| 5,625,613 | 4/1997 | Kato et al | 369/112 |
| 5,638,353 | 6/1997 | Takahashi | 369/112 |
| 5,659,533 | 8/1997 | Chen et al. | 369/94 |

FOREIGN PATENT DOCUMENTS

A-8-55363  2/1996  Japan.

*Primary Examiner*—Eddie P. Chan
*Assistant Examiner*—Kim-Kwok Chu
*Attorney, Agent, or Firm*—Oliff & Berridge PLC.

[57] ABSTRACT

To reduce a weight of an optical pickup device that may reproduce information recorded in a plurality of kinds of optical discs having different use wavelengths, a laser beam light source 1 and a hologram optical unit 14 are provided as light sources for emitting light to reproduce the information of the optical discs having different use wavelength. In order to introduce the light into recording layers of the optical discs 2a and 2b, an actuator moving area 7 is disposed in the emission space of the light. The actuator moving area 7 is composed of a numerical-aperture-controlling filter 8 and an objective lens 9. Due to the change of the focusing position of the objective lens 9 by the numerical-aperture-controlling filter 8 in response to a kind of the optical discs 2a and 2b, the light beam is optimally converged to the recording layers of the optical discs 2a and 2b, respectively.

3 Claims, 8 Drawing Sheets

PRIOR ART

PRIOR ART

PRIOR ART 5,793,734

1
OPTICAL PICKUP DEVICE

BACKGROUND OF THE INVENTION

1. Field of the Invention

The present invention relates to an optical pickup device for an optical disc drive.

2. Description of the Related Art

Optical-disc-recording information is recorded by irradiating a laser beam onto a recording layer of an optical disc to form pits therein. The presence/absence of the pits is detected during a reproduction of recorded information in accordance with an intensity of reflection of the irradiated laser beam. A type of the optical discs is determined by a wavelength of the laser beam for forming the pits. Also, the wavelength of the laser beam to be used in reproduction of the information varies in correspondence with the type of the optical disc. For instance, the optical discs currently available are categorized-into CDs, CD-Rs and phase change type PD (all of which will hereinafter be referred to as standard optical discs) corresponding to a light source having a 780 nm wavelength zone, or DVDs (hereinafter referred to as a high density optical discs) corresponding to a light source having a from 635 nm to 650 nm wavelength zone.

Thus, since the reproduction of the information recorded in a variety of kinds of optical discs having different wavelength ranges is carried out in a single optical pickup device, one approach is proposed in Japanese Patent Application Laid-Open No. Hei 8-55363 which relates to an optical pickup device provided with an optical head as shown in FIGS. 10 and 11.

In this optical pickup device shown in FIG. 10, a first laser beam light source 1 is disposed at a predetermined interval in confronted relation with an optical disc 2a which is a recording medium. In this case, the optical disc 2a is of a high density optical recording type and has a thickness of 0.6 mm. Between the laser beam light source 1 and the optical disc 2a, a collimating lens 3, a beam splitter 4, a wavelength plate 5, a wavelength selection mirror 6 and an actuator moving area 7 are disposed in the order viewed from the laser beam light source 1.

The collimating lens 3 is used to convert the light beam emitted from the laser beam light source 1 into a parallel light flux. The beam splitter 4 has a "half" mirror in its interior for bifurcating the light beam that has advanced into the beam splitter 4 into a transparent light and a reflective light. The wavelength plate 5 is made of multi-refractive crystalline material for imparting a phase difference, corresponding to a multiple number of a fraction of the wavelength, to two mutually vertical diffractive components. In this optical pickup device, the wavelength plate 5 is set for generating a phase difference of π/2 for a light beam having a wavelength of 635 nm which is available on the optical disc 2a as the high density optical disc, and for generating a phase difference of π for a light beam having a wavelength of 780 nm which is available on the optical disc 2b as the standard optical disc (to be described in detail). The wavelength selection mirror 6 has the same function as that of the beam splitter 4.

In FIG. 10, a light receiver 12 is disposed at a position which is perpendicular to an axis between the laser beam light source 1 and an optical disc 2a and which is faced to the beam splitter 4. A cylindrical lens 13 is interposed between the beam splitter 4 and the light receiver 12. The cylindrical lens 13 is used for converging the light beam to the light receiver 12.

2

Also, a hologram optical unit 14 is disposed at a position which is perpendicular to the axis between the laser beam light source 1 and the optical disc 2a and which is faced to the wavelength selection mirror 6. The hologram optical unit 14 has the functions of the light source and the light receiver. In more detail, the hologram optical unit 14 is composed of a laser beam optical source, a hologram for separating the reflective light reflected by the optical disc to provide a spatial change, and an optical detector for receiving the reflective light.

The collimating lens 15 is interposed between the wavelength selection mirror 6 and the hologram optical unit 14. The collimating lens 15 converts the optical beam emitted from the hologram optical unit 14 into a parallel light flux.

FIG. 11 shows the actuator moving area 7 in case of reproduction of the information recorded in the optical disc 2b. In this case, the optical disc 2b is the standard optical disc and has a thickness of 1.2 mm.

An objective lens 9 and a movable numerical-aperture-controlling plate 22 which is movable by a drive mechanism 21 are disposed in the above-described actuator moving area 7.

The objective lens 9 has a numerical-aperture for converging, to a recording layer of the optical disc 2a, the light beam that has passed through the objective lens 9. Thus, since the objective lens 9 is caused to correspond to the optical disc 2a, in the case where the information of the optical disc 2b is to be reproduced, an aberration is generated due to a difference in thickness of the optical discs. It is therefore impossible to converge the light beam that has passed through the objective lens 9 to the recording layer of the optical disc 2b. Accordingly, it is impossible to reproduce the information of the optical disc 2b.

Accordingly, the movable numerical-aperture-controlling plate 22 having a numerical-aperture is provided for converging the light beam that has passed through the objective lens 9 onto the recording layer of the optical disc 2b in an optimum condition. As described above, since the movable numerical-aperture-controlling plate 22 is movable by the drive mechanism 21, as shown in FIG. 11, in the case where the information of the optical disc 2b is reproduced, the drive mechanism 21 is driven for shifting the movable numerical-aperture-controlling plate 22 to the path of the light beam to thereby converge the light beam onto the recording layer of the optical disc 2b in the optimum condition.

In addition, there is another approach of the single optical pickup device for reproducing the information in a plurality of kinds of optical discs having difference wavelengths in use. As shown in FIG. 12, the device has such a structure that an objective lens 9 for a high density optical disc and an objective lens 9' for a standard optical disc are mounted on the above-described actuator moving area 7. In correspondence with the kind of the optical disc 2a or 2b loaded on the device, the objective lens 9 or the objective lens 9' is switched over for reproducing the information recorded in two kinds of optical discs 2a and 2b.

Also, as shown in FIG. 13, there is still another approach of the optical pickup device. The above-described actuator moving area 7 is composed of an objective lens 9, a liquid crystal shutter 23 and a control circuit 14. The liquid crystal shutter 23 is provided with a light shielding portion 25 (indicated by hatching) and the light beam may be switched over in shut-off condition or in transparent condition. The structure other than that of the light shielding portion 25 of the liquid crystal shutter 23 is made as a light transparent portion 26 through which any light beam having the wavelengths corresponding to the optical disc 2a and the optical disc 2b may pass.

In the case where the information recorded in the optical disc 2a is reproduced, the control circuit 24 is turned off, and also, the light beam passes through the light shielding portion 25 and the objective lens 9 to be converged onto the recording layer of the optical disc 2a.

On the other hand, in the case where the information recorded in optical disc 2b is reproduced, the control circuit 24 is turned on, then, the light beam is shut off by the light shielding portion 25 and passes only through the light transparent portion 26. As a result, the light beam passes through the objective lens 9, so that the light beam is converged onto the position of the recording layer of the optical disc 2b, and then, the information reproduction becomes possible.

By the way, as described above, since the thickness of the optical disc 2a and the optical disc 2b having different wavelength in use varies, in the optical pickup device shown in FIG. 10, the movable numerical-aperture-controlling plate 22 is provided in the actuator moving area 7 for converging the light beam onto the respective recording layers of the optical discs 2a and 2b by the single objective lens 9. In the case where the information recorded in the optical disc 2a is reproduced, the light beam does not pass through the movable numerical-aperture-controlling plate 22 but passes only through the objective lens 9 to be converged onto the recording layer of the optical disc 2a. On the other hand, in the case where the information recorded in the optical disc 2b is reproduced, the light beam passes through the movable numerical-aperture-controlling plate 22 and converges onto the optimum converging position relative to the recording layer of the optical disc 2b after the passage through the objective lens 9.

Thus, depending upon which optical disc 2a or 2b is to be played back, the movable numerical-aperture-controlling plate 22 has to be moved. Thus, the drive mechanism 21 for moving the movable numerical-aperture-controlling plate 22 is required in the actuator moving area 7. As a result, the weight of the actuator moving area 7 is increased, which leads to a degradation in characteristics of the actuator.

Also, in the case of the structure of the optical pickup device shown in FIG. 12 in which the objective lens 9 for the high density optical disc and the objective lens 91 for the standard optical disc are mounted on the actuator moving area 7, depending upon which optical disc 2a or 2b is to be played back, the switch-over between the objective lens 9 and the objective lens 9' is required. Accordingly, the switching mechanism (not shown) should be provided in the actuator moving area 7. As a result, the switching mechanism and the two objective lenses 2a and 2b are provided in the actuator moving area 7. Accordingly, the weight is increased, which leads to a degradation in characteristics of the actuator moving area 7.

Then, in case of reproducing the information recorded in either optical disc 2a or 2b, the corresponding one of the objective lenses 9 and 9' is positioned in the path of the light beam. Accordingly, the displacement of the optical axis is liable to occur.

In the case where the liquid crystal shutter 23 is provided in the actuator moving area 7 for converting the light beam onto the respective recording layers of the optical discs 2a and 2b by the single objective lens 9 as in the optical pickup device shown in FIG. 13, when one of the optical discs 2a and 2b is to be played back, the control circuit 24 is used for turning on/off. Accordingly, the weight of the actuator moving area 7 is increased, which leads to a degradation in characteristics of the actuator moving area 7.

SUMMARY OF THE INVENTION

Accordingly, in order to overcome the above-noted defects, an object of the present invention is to provide an optical pick up device that may enhance the characteristics by reducing a weight of an actuator moving area and also may reproduce information recorded in a first optical disc and a second optical disc.

To attain this and other objects, according to the invention of claim 1, there is provided an optical pickup device including a beam splitter, an optical lens system and a light receiver for detecting information recorded in a recording medium by reflecting a light on a recording layer of the recording medium, the optical pickup device comprising:

a first light source for emitting a first light;

a second light source for emitting a second light, the wavelength of which is different from that of the first light source;

a light converging means for converging the light onto a first recording medium corresponding to the emission wavelength of the first light emitted from the first light source; and a filter for transmitting the first light irradiated from the first light source and for interrupting a part of the second light irradiated from the second light source, which is provided at a region between the light converging means and the light sources in order to converge the light onto the second recording medium, which corresponds to the emission wavelength from the second light source.

According to a second aspect of the invention, the filter is disposed in an actuator moving area of the light,; converging means.

According to a third aspect of the invention, the filter is formed integrally with the light converging means.

DESCRIPTION OF THE PREFERRED EMBODIMENTS

Figure 1:
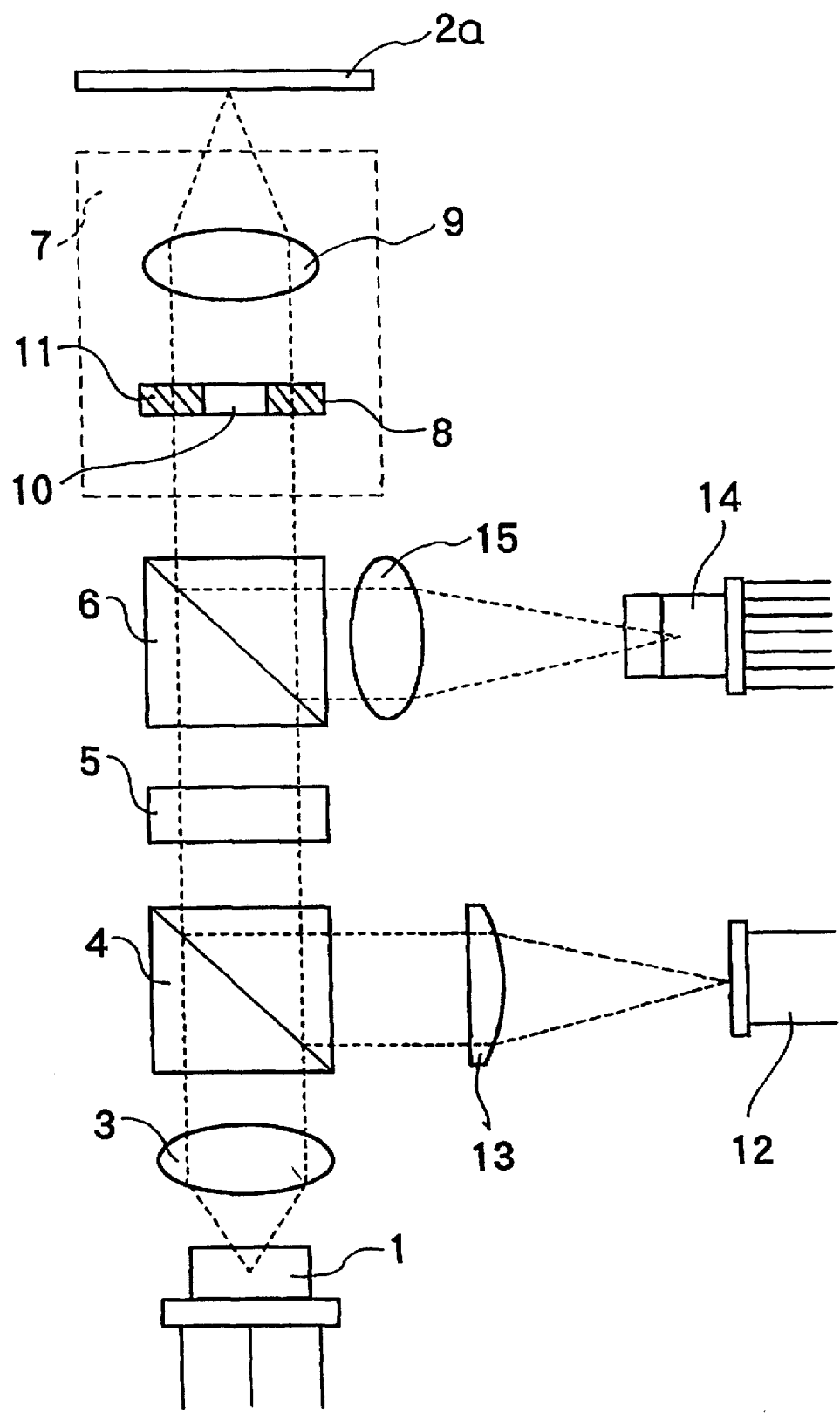
FIG. 1 is a schematic view showing a structure of an optical pickup device in accordance with an embodiment of the present invention.

An optical pickup device according to an embodiment of the present invention will now be described with reference to the accompanying drawings. In the drawings, the same reference numerals are used to indicate the same components or members described in connection with the prior art.

The optical pickup device shown in FIG. 1 is different in respect of a structure of the actuator moving area 7 compared with that of the conventional optical pickup device.

Figure 2:
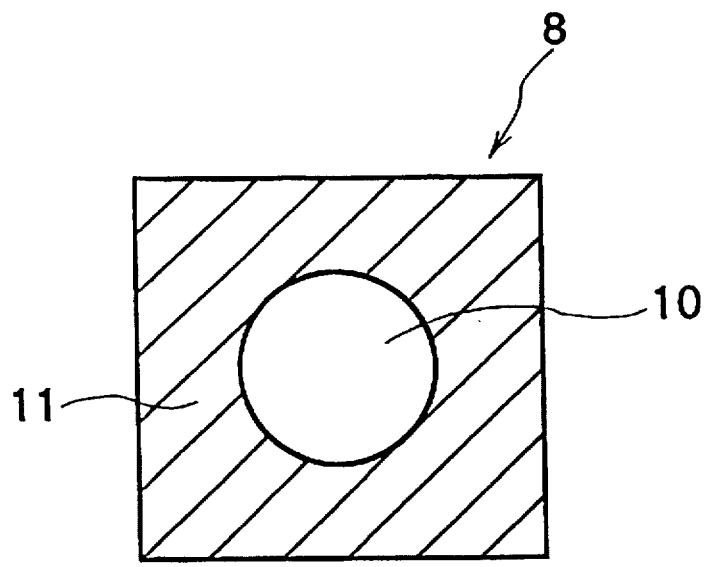
FIG. 2 is a schematic view showing a structure of a numerical-aperture-controlling filter.
Figure 3:
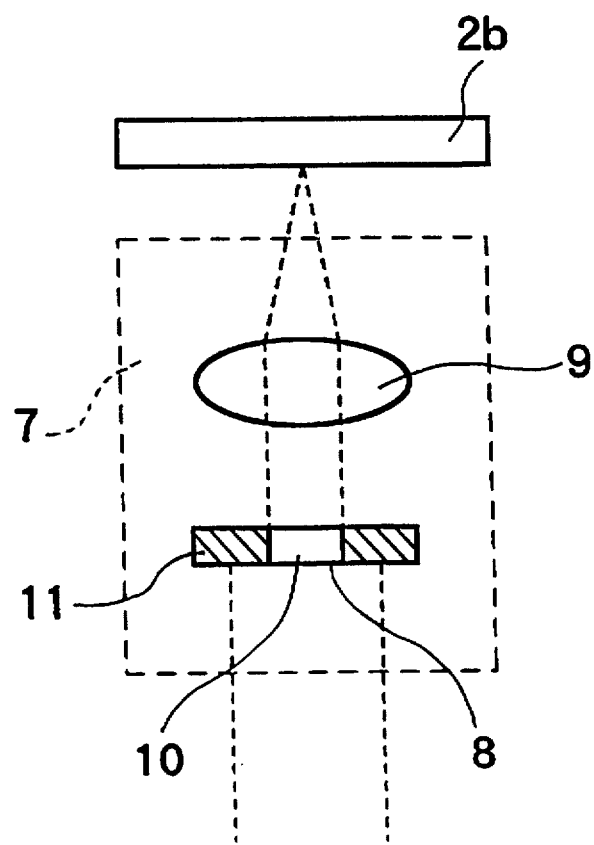
FIG. 3 is a schematic view illustrating an optical path within an actuator moving portion upon playback of a standard optical disc using the optical pickup device according to the present invention.

The actuator moving area 7 is composed of a numerical-aperture-controlling filter 8 and an objective lens 9. As schematically shown in FIG. 2, the numerical-aperture-controlling filter 8 is composed of a transparent portion 10 through which the light beam passes through irrespective of the wavelength zone and a filter portion 11 (indicated by hatching) which is subjected to a limitation in transparent light beam depending upon its wavelength. The objective lens 9 which has a numerical-aperture having following effects is used. Namely, after passing through the lens 9, upon reproduction of the information recorded in the optical disc 2a shown in FIG. 1, the light beam which is in such a range of wavelength that it passes through the transparent portion 10 and the filter portion 11 is converged onto the recording layer of the optical disc 2a optimally, and upon reproduction of the information recorded in the optical disc 2b shown in FIG. 3, the light beam which is in such a range of wavelength that it passes through only the transparent portion 10 while it is interrupted at the filter portion 11 is converged onto the recording layer of the optical disc 2b optimally.

Figure 4:
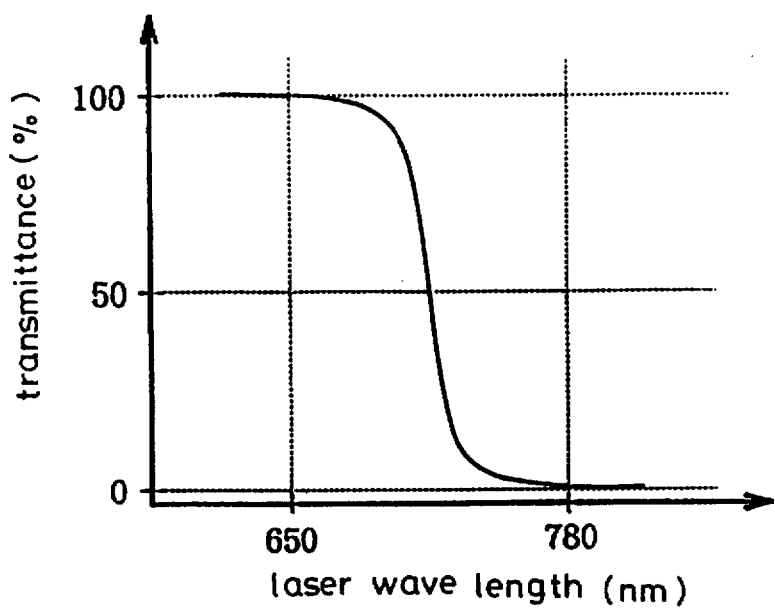
FIG. 4 is a graph showing characteristics of the filter portion of the numerical-aperture-controlling filter.

As shown in FIG. 4, the filter portion 11 has such characteristics that the light beam of 650 nm is a wavelength corresponding to the optical disc 2a as a high density optical disc, which passes through the filter portion 11 by 100%, and that the light beam of 780 nm is a wavelength corresponding to the optical disc 2b as a standard optical disc, which is shut off by 100%. For example, films on which a multi-layer coating is formed by using $SiO_2$, $TiO_2$ or the like are used as the filter portion 11 having the above characteristics. In this case, it is preferable that the transparent portion 10 be protected by a mask in order to avoid the adhesion of $SiO_2$, $TiO_2$ or the like on the transparent portion 10. The filter portion 11 is not limited to that described above but any method and material may be used therefor if it has the characteristics shown in FIG. 4.

Figure 5:
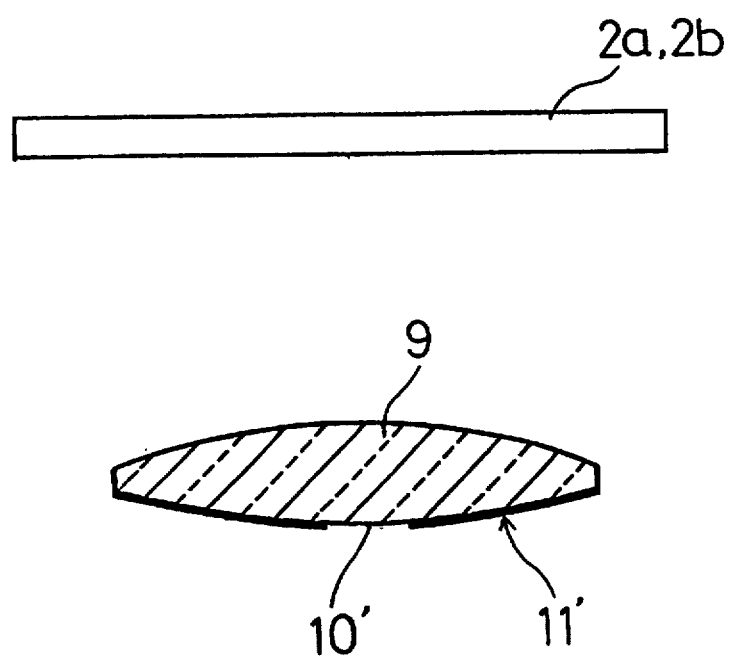
FIG. 5 is a schematic view showing a structure in the case where the numerical-aperture-controlling filter is formed integrally with an objective lens.

In order to further decrease a weight of the actuator moving area 7, as shown in FIG. 5, it is possible to form a multi-layer coating on one surface of the objective lens 9 by using $SiO_2$, $TiO_2$ or the like so that the transparent portion 10' and the filter portion 11' are formed integrally with the objective lens 9. Also, in this case, the objective lens 9 which has a numerical-aperture having following effects is used. Namely, after passing through the lens 9, upon reproduction of the information recorded in the optical disc 2a, the light beam which is in such a range of wavelength that it passes through the transparent portion 10' and the filter portion 11' is converged onto the recording layer of the optical disc 2a optimally, and upon reproduction of the information recorded in the optical disc 2b, the light beam which is in such a range of wavelength that it passes through only the transparent portion 10' while it is interrupted at the filter portion 11' is converged onto the recording layer of the optical disc 2b optimally.

The playback of optical disc 2a and the optical disc 2b by using the optical pickup device according to the present invention will now be described.

Figure 6:
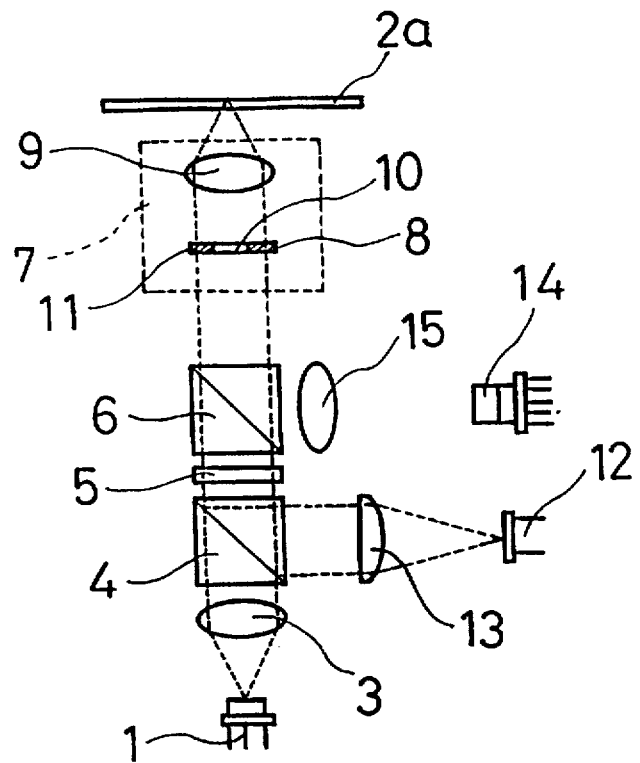
FIG. 6 is a schematic view illustrating an optical path upon playback of a high density recording optical disc using the optical pickup device according to the present invention.

FIG. 6 shows the case where the optical disc 2a is used for playback. The light beam corresponding to the wavelength range for irradiating to the optical disc 2a for playback is ranged in 635 nm to 650 nm. The light beam having a wavelength in this range is irradiated from the laser beam light source 1. The emitted light beam advances through the collimating lens 3, the beam splitter 4, the wavelength plate 5, the wavelength selection mirror 6 and the actuator moving area 7 disposed on the optical path.

The light beam is introduced into the numerical-aperture-controlling filter 8 in the actuator moving area 7. As described above, since the filter portion 11 of the numerical-aperture-controlling filter 8 has the characteristics shown in FIG. 4 and the light beam emitted from the laser beam light source 1 is transmissive, the light beam simply passes through the numerical-aperture-controlling filter 8 and enters the objective lens 9. By passing through the objective lens 9, the light beam is focused on the recording layer of the optical disc 2a. The focused light beam is reflected on the recording layer of the optical disc 2a.

The light beam that has been reflected on the optical disc 2a advances through the actuator moving area 7, the wavelength selection mirror 6, the wavelength plate 5, the beam splitter 4 and the collimating lens 3 disposed all in the above-described optical path. During the transmission of the beam splitter 4, the reflective beam reflected in the right side in FIG. 6 is converged by the cylindrical lens 13 and detected by the light receiver 12. The light beam is converted into a current by the light receiver 12. In accordance with the intensity of the current, the information recorded in the optical disc 2a may be reproduced.

Figure 7:
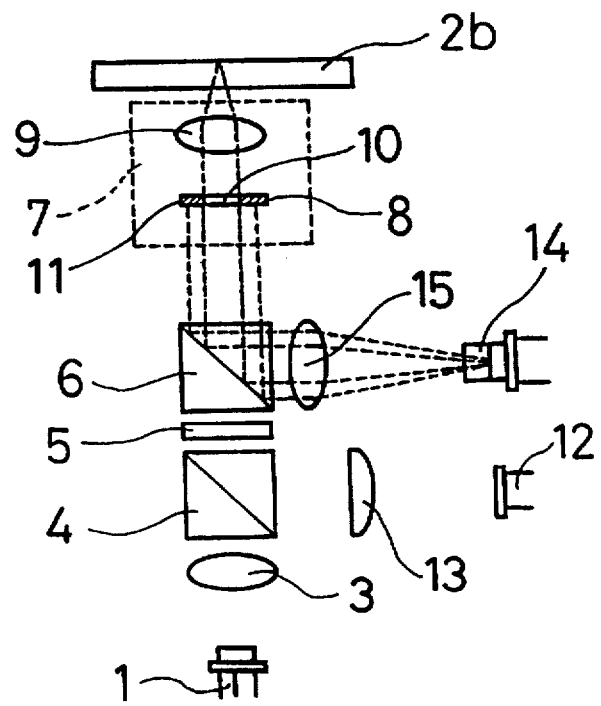
FIG. 7 is a schematic view illustrating an optical path upon playback of the standard optical disc using the optical pickup device according to the present invention.

The case where the optical disc 2b is used for playback will be described with reference to FIG. 7. The light beam corresponding to the wavelength range for irradiating to the optical disc 2b for play back is in the range of 780 nm. The beam having a wavelength in this range is emitted from the hologram optical unit 14. The emitted light beam passes through the collimating lens 15 to be thereby converted into a parallel light flux, and thereafter enters the wavelength selection mirror 6.

The light beam is bifurcated into the transmissive light and reflective light during the transmission of the wavelength selection mirror 6. The reflective light of the light beam enters the actuator moving area 7. Since the filter portion 11 of the numerical-aperture-controlling filter 8 provided in the actuator moving area 7 interrupts the light beam emitted from the hologram optical unit 14 as shown in FIG. 4, the light beam only passes through the transparent portion 10 of the numerical-aperture-controlling filter 8 and enters the objective lens 9. Thus, since the light beam which has passed only through the transparent portion 10 is subjected to the numerical-aperture control upon passing through the objective lens 9, the light beam is optimally focused on the recording layer of the optical disc 2b. The focused light beam is reflected on the recording layer of the optical disc 2b.

The light beam that has been reflected on the optical disc 2b advances through the actuator moving area 7, the wavelength selection mirror 6, the wavelength plate 5, the beam splitter 4 and the collimating lens 3 disposed all in the above-described optical path. During the transmission of the wavelength selection mirror 6, the reflective beam reflected in the right side in FIG. 7 is detected by the hologram optical unit 14 through the collimating lens 15. The light beam is converted into a current by the hologram optical unit 14. In accordance with the intensity of the current, the information recorded in the optical disc 2b may be reproduced.

Figure 8:
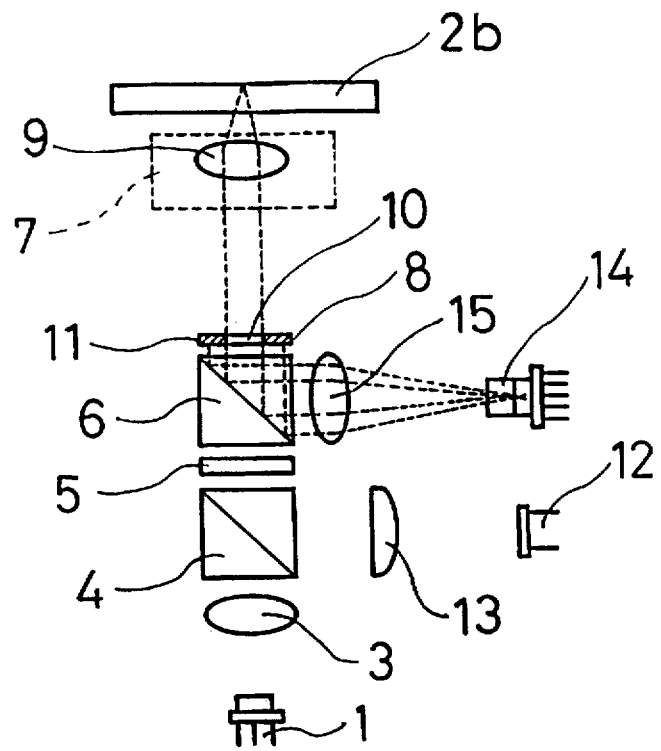
FIG. 8 is a schematic view illustrating an optical path upon playback of a standard optical disc by using an optical pickup device according to a comparison example.

An optical pickup device (comparison example) having a structure different from the foregoing optical pickup device according to the embodiment of the present invention will now be described with reference to FIGS. 8 and 9. In the optical pickup device of this comparison example, the numerical-aperture-controlling filter 8 is not provided in the actuator moving area 7 but in the vicinity of the wavelength selection mirror 6 on the actuator moving area 7 side.

In the case where the thus arranged optical pickup device is used, upon the playback of information recorded in the optical disc 2a, the production is possible in the same way as in the optical pickup device explained in connection with FIG. 6. On the other hand, in the case where the optical disc 2b is used for playback, as shown in FIG. 8, it is preferable that it is played back in the same manner as in the optical pickup device according to the present invention explained in connection with FIG. 7.

However, as a matter of fact, since the light beam is not optimally converged in the recording layer to thereby generate a tracking error, it is impossible to reproduce the information recorded in the optical disc 2b. The reason for this is that, as described above, the objective lens 9 has the numerical-aperture characteristics for converging the light beam optimally on the recording layer of the optical disc 2a, so that the light beam is not converged on the recording layer of the optical disc 2b. For this reason, in the optical pickup device according to the present invention, the numerical-aperture-controlling filter 8 is provided in place. However, in the comparison example, the numerical-aperture-controlling filter 8 is provided in the vicinity of the wavelength selection mirror 6 on the actuator moving area 7 side. Therefore, the light beam emitted from the hologram optical unit 14 only passes through the transparent portion 10 of the numerical-aperture-controlling filter 8. However, since it is provided a predetermined space relative to the objective lens 9, the light beam deviates from the center of the objective lens 9, so that it cannot be optimally converged in the recording layer of the optical disc 2b.

Figure 9:
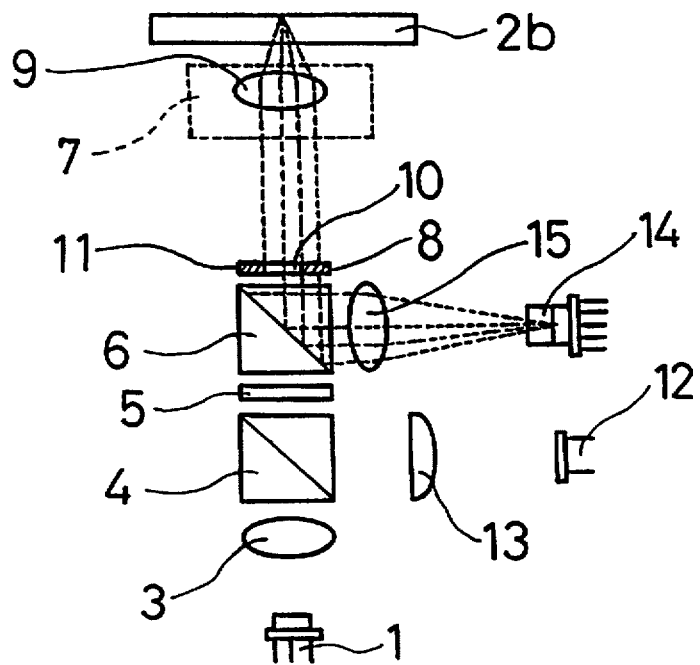
FIG. 9 is a schematic view illustrating an optical path upon playback of a standard optical disc by using an optical pickup device according to a comparison example in which a displacement of an optical axis is occurred.
Figure 10:
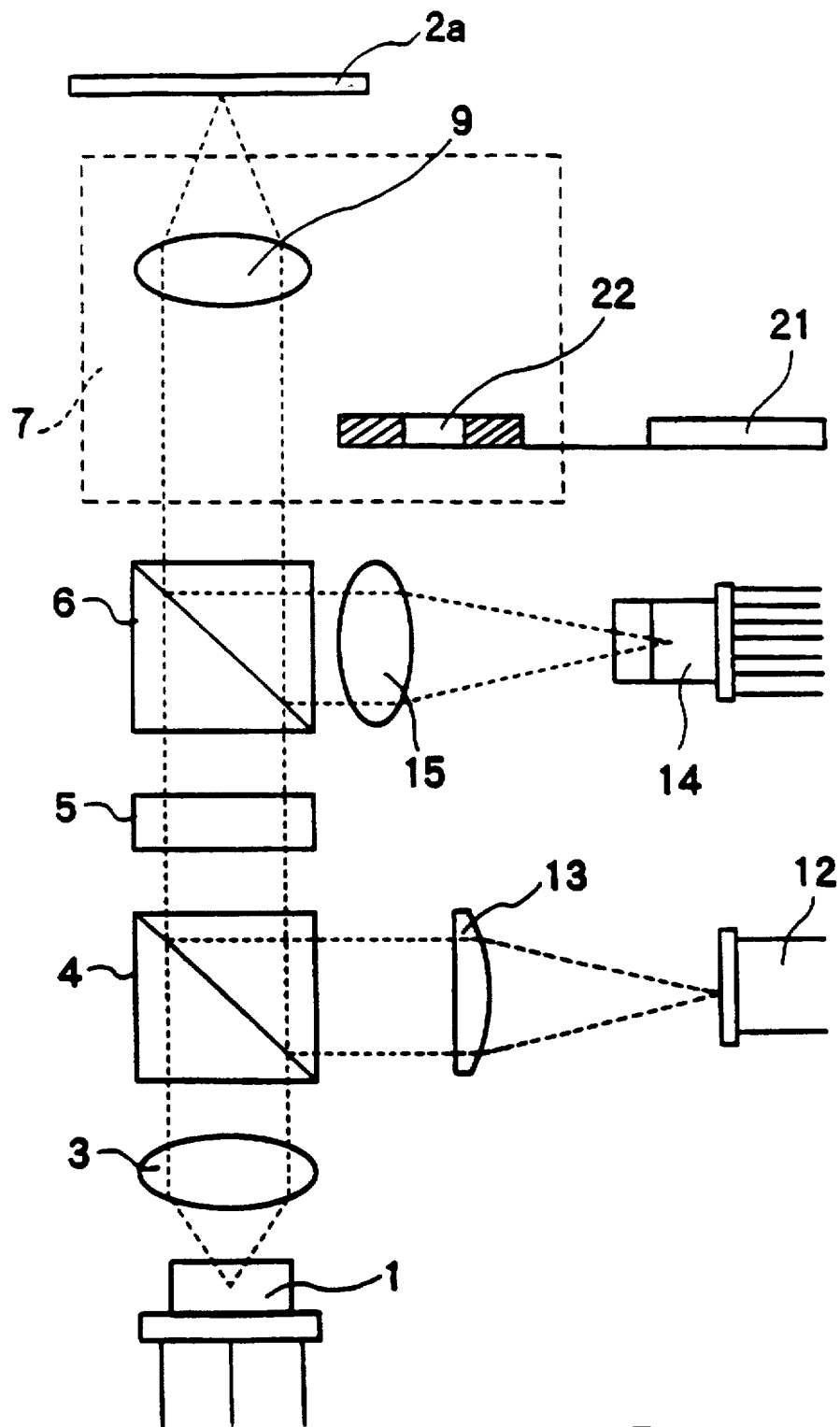
FIG. 10 is a schematic view showing a structure of an optical pickup device according to the prior art.
Figure 11:
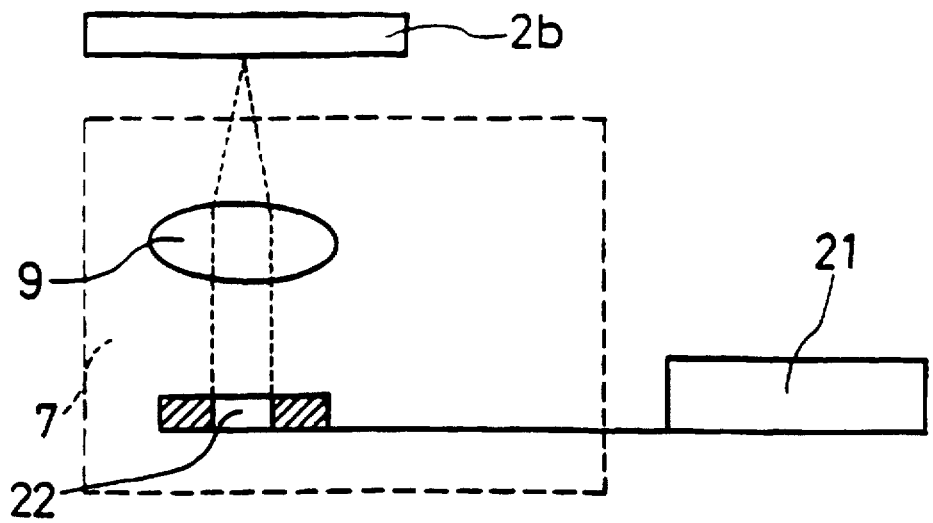
FIG. 11 is a schematic view illustrating an optical path within an actuator moving area upon playback of a standard optical disc using the optical pickup device according to the prior art.
Figure 12A:
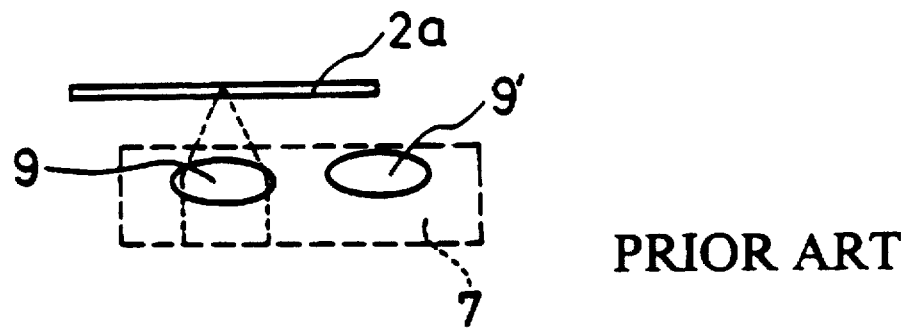
FIGS. 12(a) and 12(b) are schematic views showing a structure of an optical pickup device according to another conventional technology different from that shown in FIG. 10.
Figure 12B:
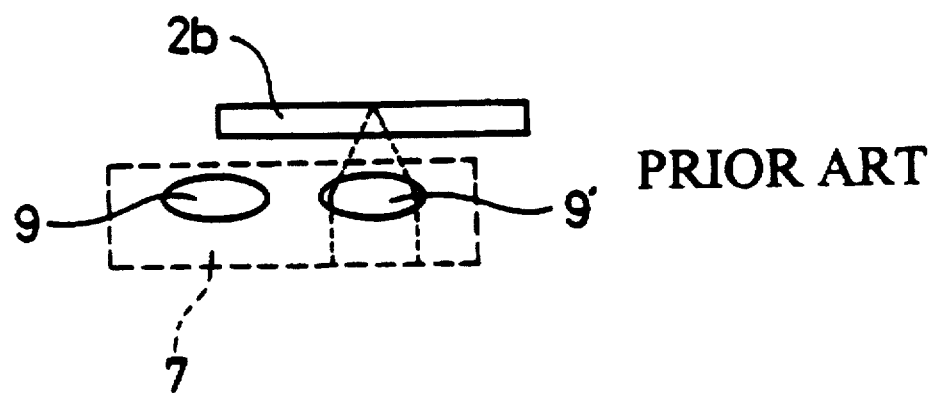
Figure 13A:
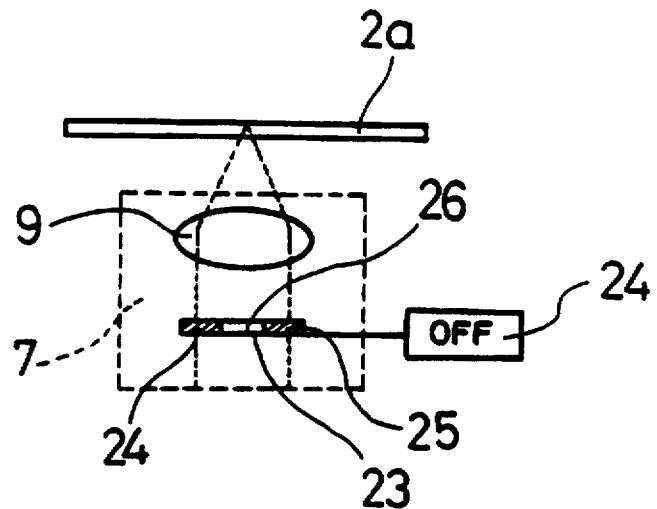
FIGS. 13(a) and 13(b) are schematic views showing a structure of an optical pickup device according to still another conventional technology different from that shown in FIG. 11.
Figure 13B:
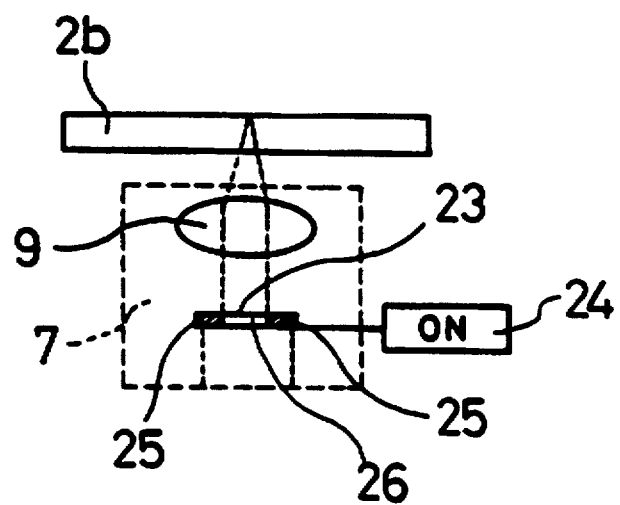

Also, as shown in FIG. 9, the larger the displacement of the center of the light beam between the optical axis and the objective lens 9 is, the larger displacement between the center of the beam light reflected on the optical disc 2b to be converged in the hologram optical unit 14 and the center of the numerical-aperture-controlling filter 8 will become. As a result, the light beam cannot pass through the transparent portion 10, and the amount of the light beam shut off by the filter portion 11 is increased. The light amount is decreased to degrade the efficiency.

As described above, since the comparison example leads to the degradation of characteristic of the optical pickup device, it does not sufficiently play the effect of the numerical-aperture-controlling filter 8.

As described above, according to the invention of the claim 1, since the numerical-aperture-controlling filter which is composed of the transparent portion and the filter portion is disposed on the optical path of the light beam, it is possible to carry out the playback and to reduce the weight without providing any switching mechanism for playback of a plurality of kinds of optical discs in different wavelength in use. For this reason, it is possible to simplify the optical pickup device. Due to merely changing the focusing position of the objective lens by a numerical-aperture-controlling filter, it is possible to switch over a plurality kinds of the optical discs in different wavelength in use. Accordingly, it is possible to enhance the characteristics of the device since there is not any damage therein.

According to the invention of the claim 2, since the numerical-aperture-controlling filter is provided in the actuator moving portion, the light beam that has passed through the numerical-aperture-controlling filter is soon introduced into the objective lens. There is no tracking error caused by the displacement between the center of the optical axis and the center of the objective lens. Also, according to the invention of the claim 2, it is possible to offer the same advantage as that of the invention of the claim 1.

According to the invention of the claim 3, since the numerical-aperture-controlling filter is formed integrally with the objective lens (light beam converging means), the actuator moving portion is simplified and made light in weight. Also, according to the invention of the claim 3, it is possible to offer the same advantage as that of the invention of the claim 1.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. An optical pickup device comprising a beam splitter, an optical lens system and a light receiver for detecting information recorded in a recording medium by reflecting a light by a recording layer of the recording medium, the optical pickup device comprising;

a first light source for emitting a first light of the light;

a second light source for emitting a second light having a different wavelength from that of the first light;

a light converging means for converging the light onto a first recording medium corresponding to the first light; and a filter for transmitting the first light and for interrupting a part of the second light, which is provided between the light converging means and the light sources, whereby the light is converged onto a second recording medium corresponding to the second light.

2. The optical pickup device according to claim 1, wherein the filter is disposed in an actuator moving area of the light converging means.

3. The optical pickup device according to claim 1, wherein the filter is formed integrally with the light converging means.

* * * * *